United States Patent [19]

Antonov

[11] Patent Number: 5,514,044
[45] Date of Patent: May 7, 1996

[54] IN-SERIES AUTOMATIC TRANSMISSION MODULES DIRECTLY RESPONSIVE TO TORQUE

[75] Inventor: Roumen Antonov, Paris, France

[73] Assignee: Antonov Automotive North America B.V., Rotterdam, Netherlands

[21] Appl. No.: 40,060

[22] Filed: Mar. 30, 1993

Related U.S. Application Data

[63] Continuation-in-part of Ser. No. 780,671, Oct. 18, 1991, Pat. No. 5,263,906.

[30] Foreign Application Priority Data

Aug. 30, 1990 [FR] France ................................. 91 10784
Oct. 18, 1990 [FR] France ................................. 90 12901

[51] Int. Cl.⁶ .............................. B60K 17/08; F16H 3/74
[52] U.S. Cl. ......................... 475/257; 475/262; 475/266; 475/330
[58] Field of Search .......................... 477/908; 475/221, 475/257, 258, 259, 262, 264, 266, 269, 293, 298, 299, 300, 319, 320, 330, 344; 74/745

[56] References Cited

U.S. PATENT DOCUMENTS

| | | | |
|---|---|---|---|
| 1,239,379 | 9/1917 | Fountain | 475/266 |
| 2,046,468 | 7/1936 | La Fountain | 475/266 X |
| 2,201,848 | 5/1940 | Cotterman | 475/257 |
| 2,296,532 | 9/1942 | Mekeel, Jr. | 475/266 |
| 2,303,026 | 11/1942 | Croden | 475/257 |
| 3,228,261 | 1/1966 | Puls et al. | 475/293 X |
| 4,450,735 | 5/1984 | Koivunen et al. | 475/262 X |
| 4,854,190 | 8/1989 | Won | 475/330 X |

FOREIGN PATENT DOCUMENTS

| | | | |
|---|---|---|---|
| 613486 | 1/1961 | Canada | 475/257 |
| 635886 | 3/1928 | France | 475/262 |
| 1717420 | 3/1992 | U.S.S.R. | 475/330 |

*Primary Examiner*—Khoi Q. Ta
*Attorney, Agent, or Firm*—Kenyon & Kenyon

[57] ABSTRACT

The transmission apparatus comprises serially mounted two-speeds modules. Each module is responsive to speed and torque for shifting up when speed is relatively high and/or torque relatively low, and for shifting down in the contrary case. Speed sensitivity is provided by flyweights tending to engage a direct drive clutch. Torque sensitivity for shifting down is provided by the clutch having a limited torque capability, depending upon the force produced by the flyweights. Torque sensitivity for shifting up is provided by the helical gear teeth inducing an axial thrust which is able, or not, to oppose engagement of the clutch by the flyweights. Such a transmission apparatus can dispense with a centralized control.

30 Claims, 9 Drawing Sheets

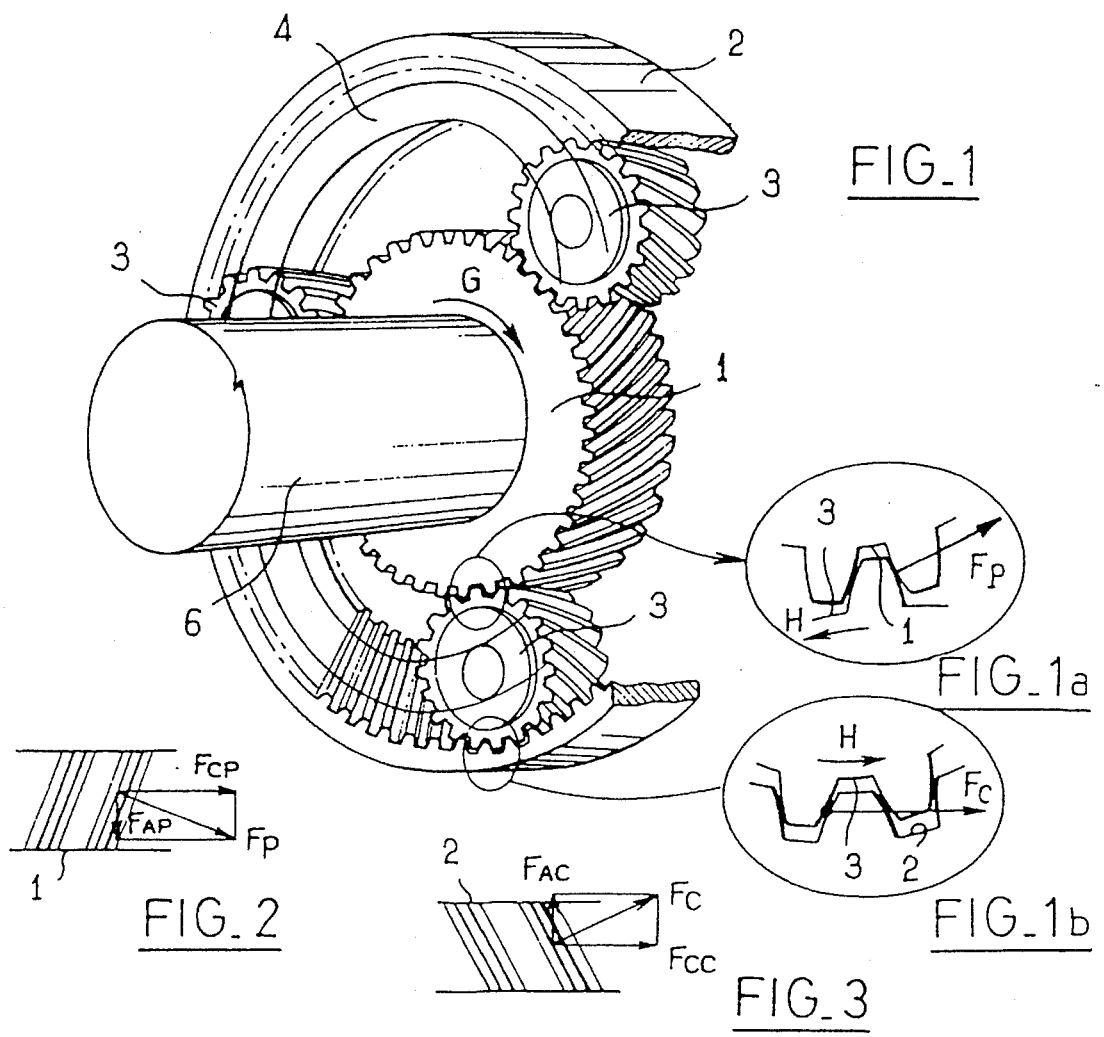
FIG_1
FIG_1a
FIG_1b
FIG_2
FIG_3
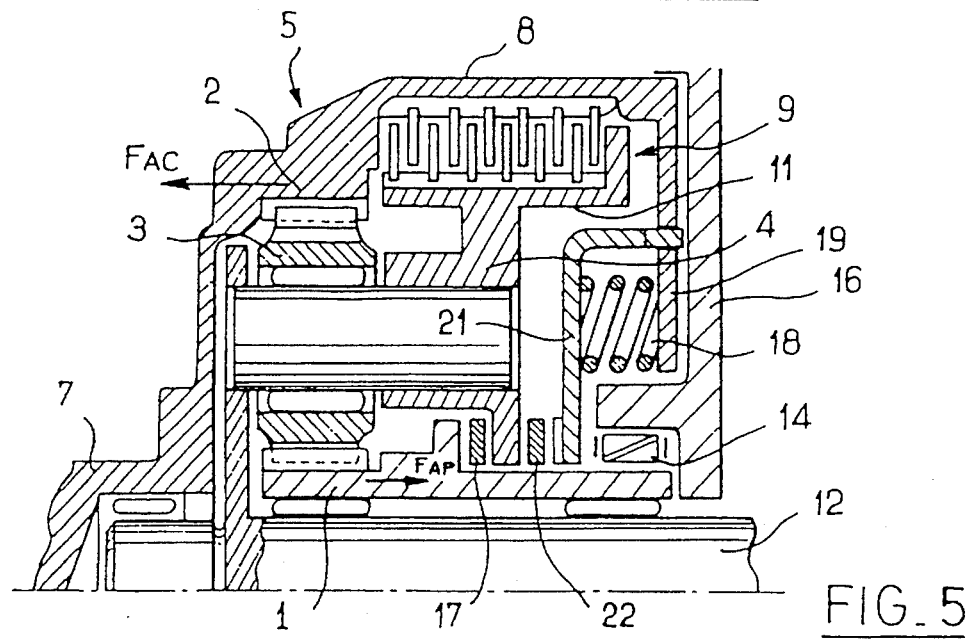
FIG_5

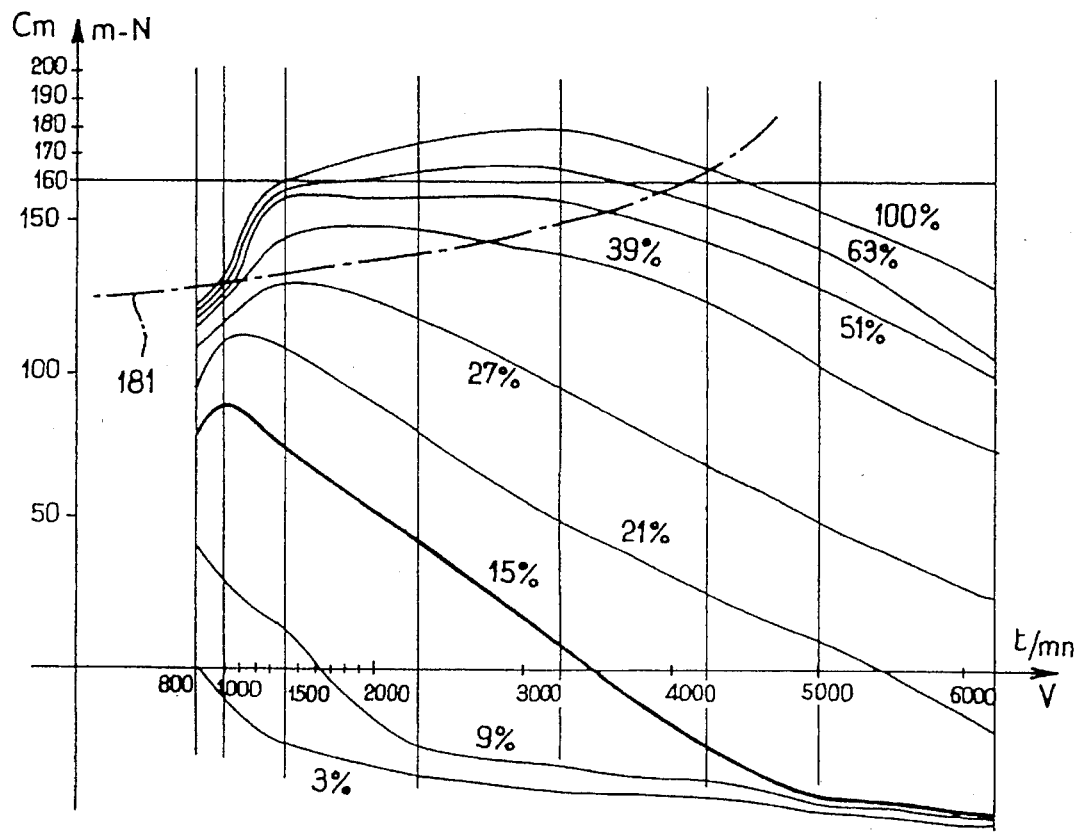
FIG_4

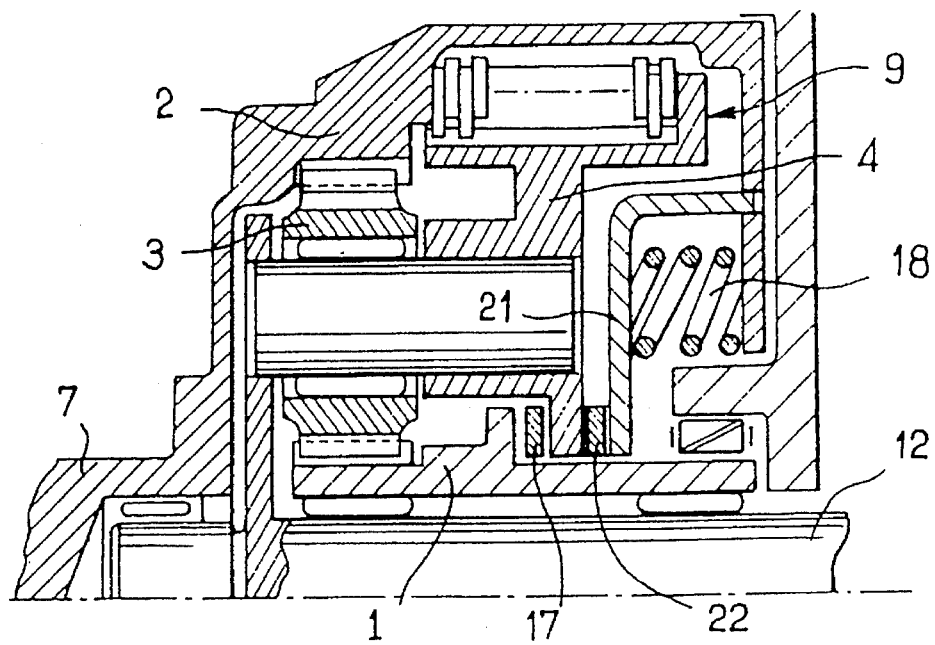
FIG_6
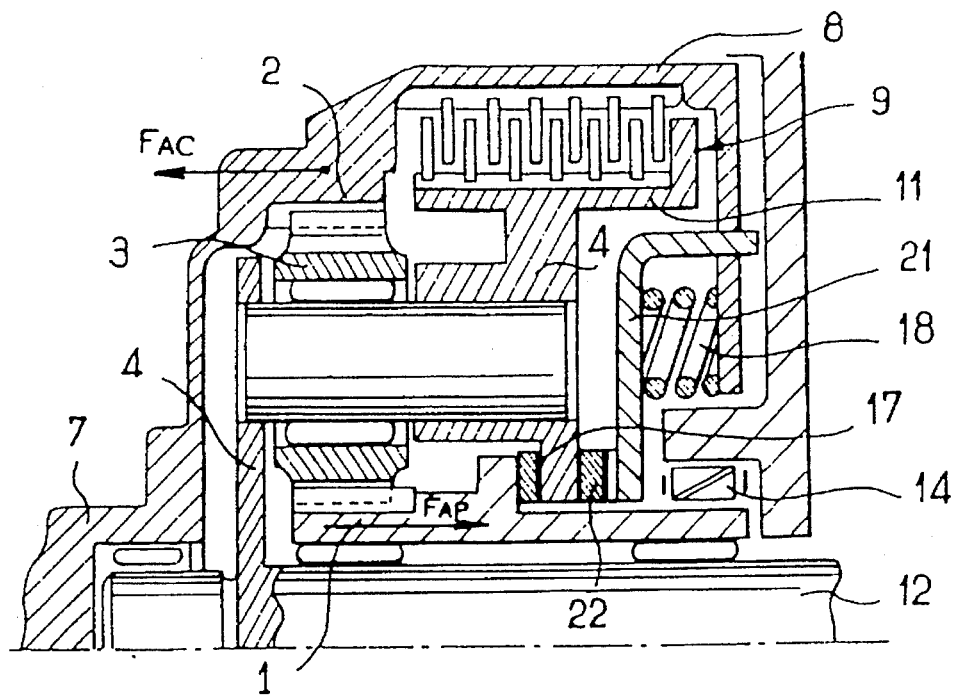
FIG_7

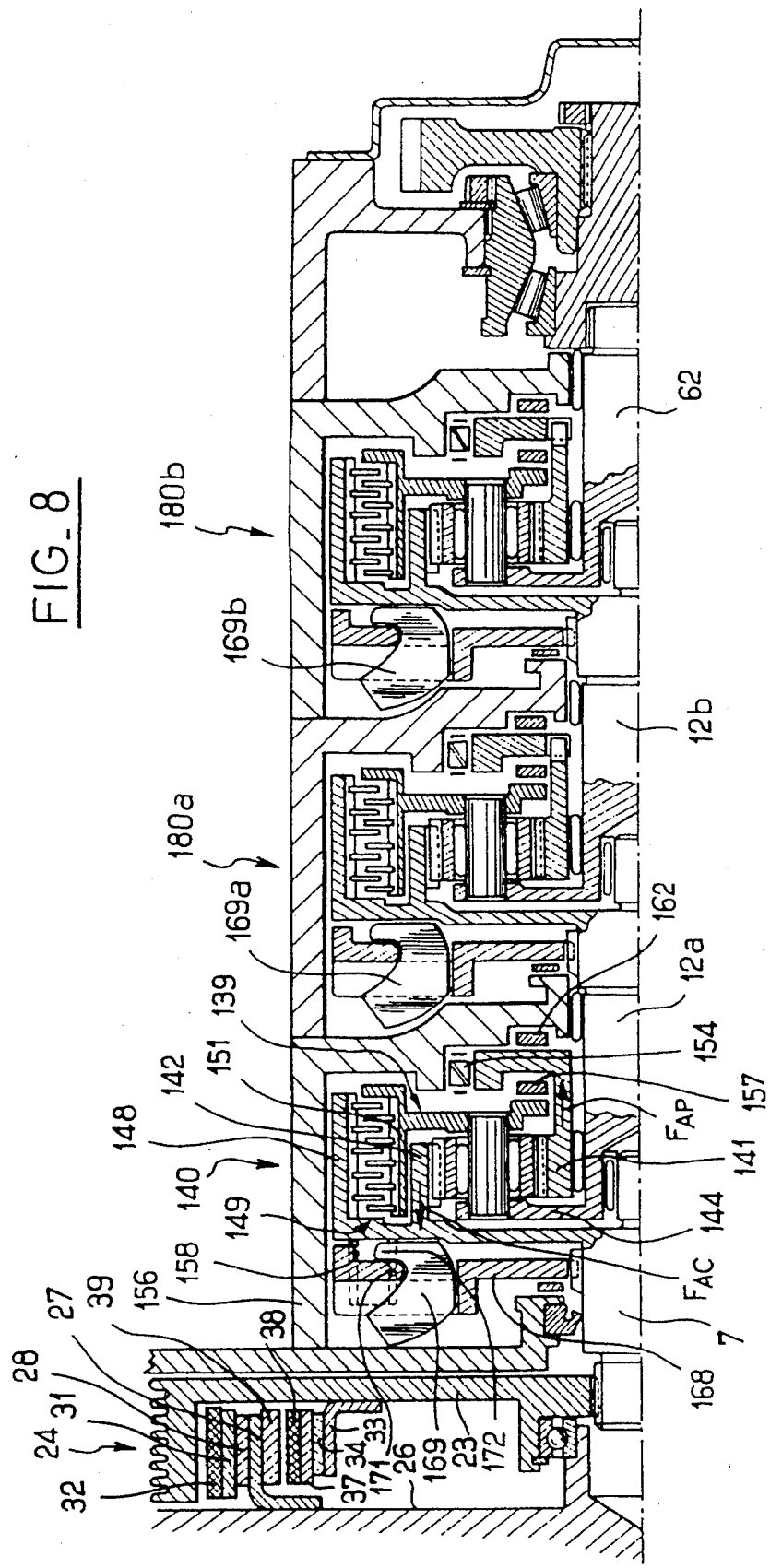
FIG_8

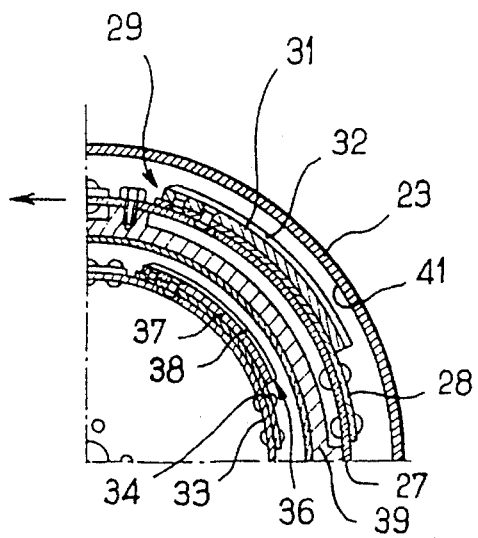
FIG_9
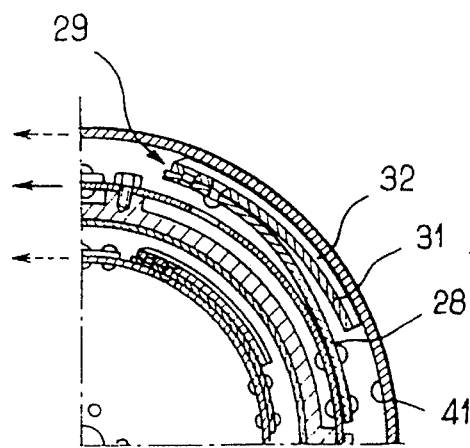
FIG_10
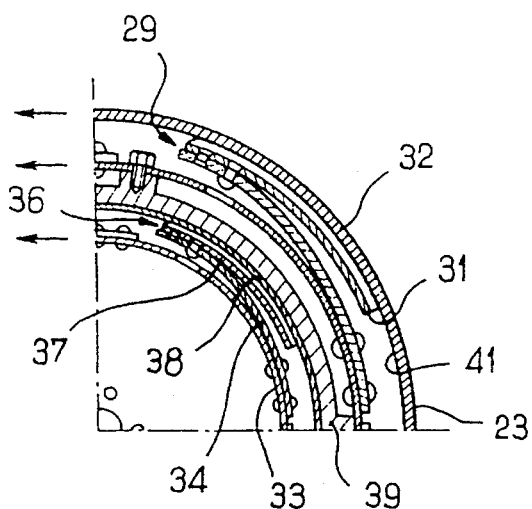
FIG_11
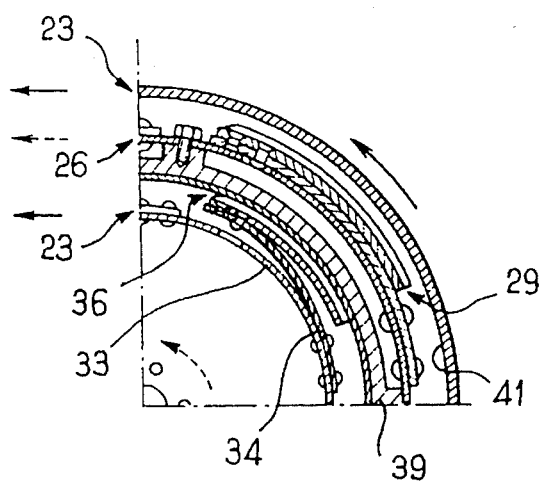
FIG_12

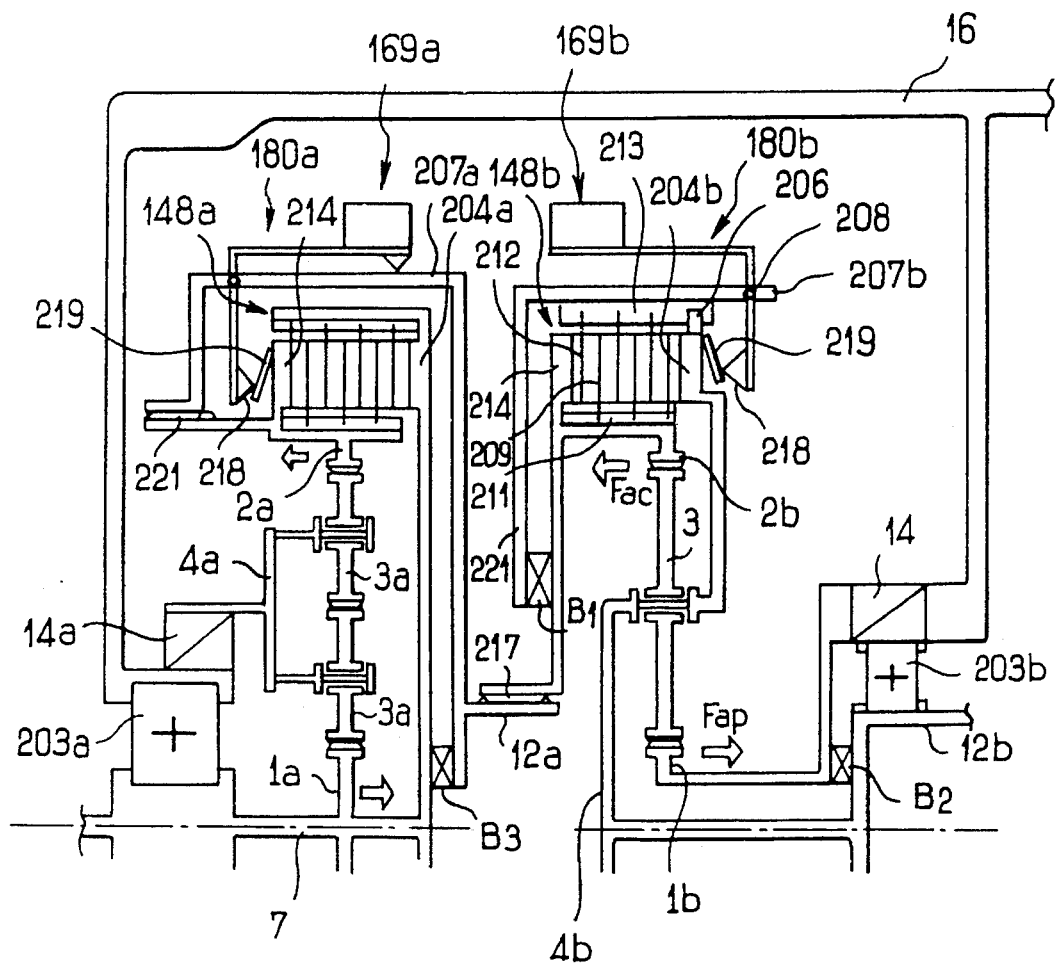
FIG_13

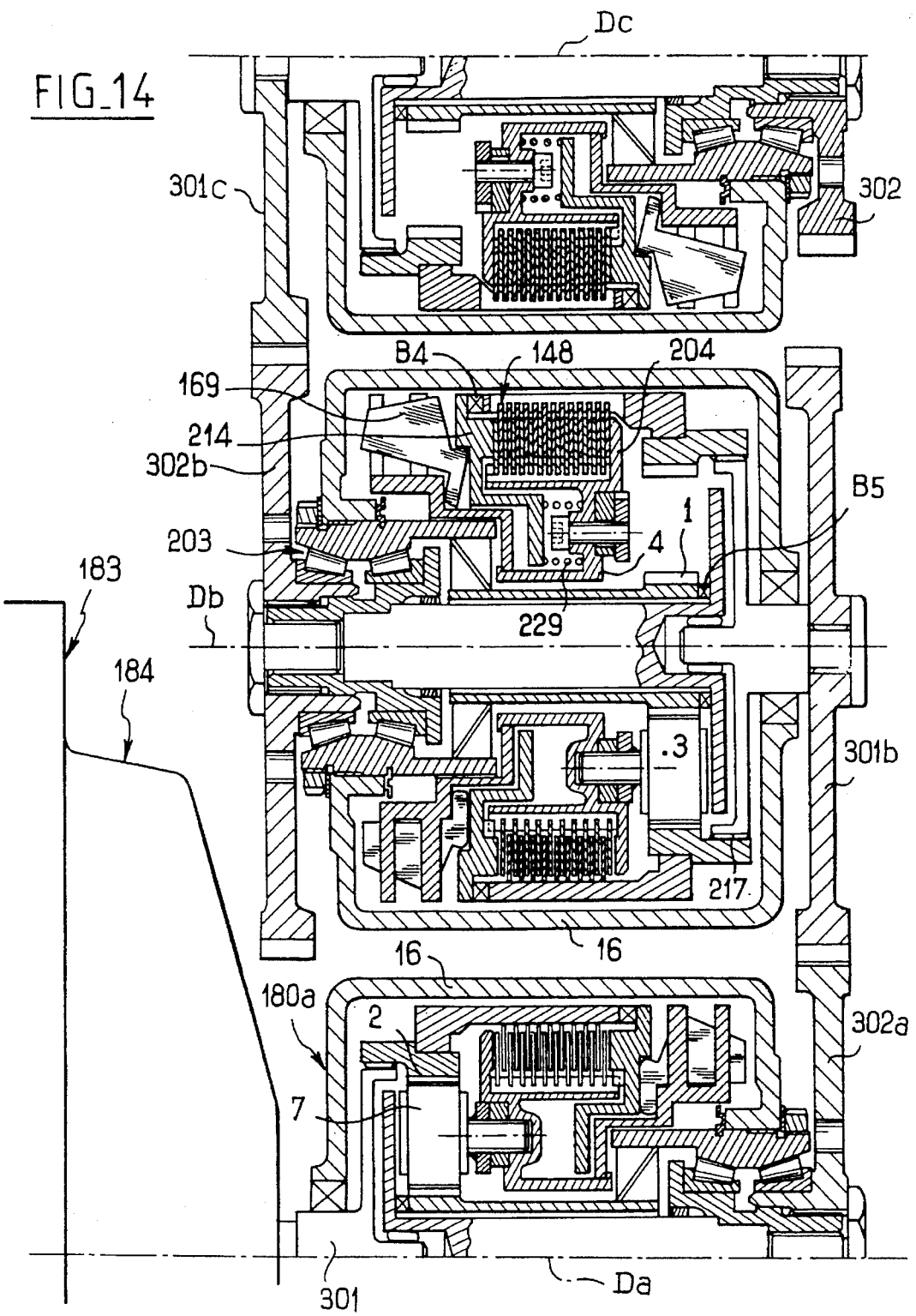

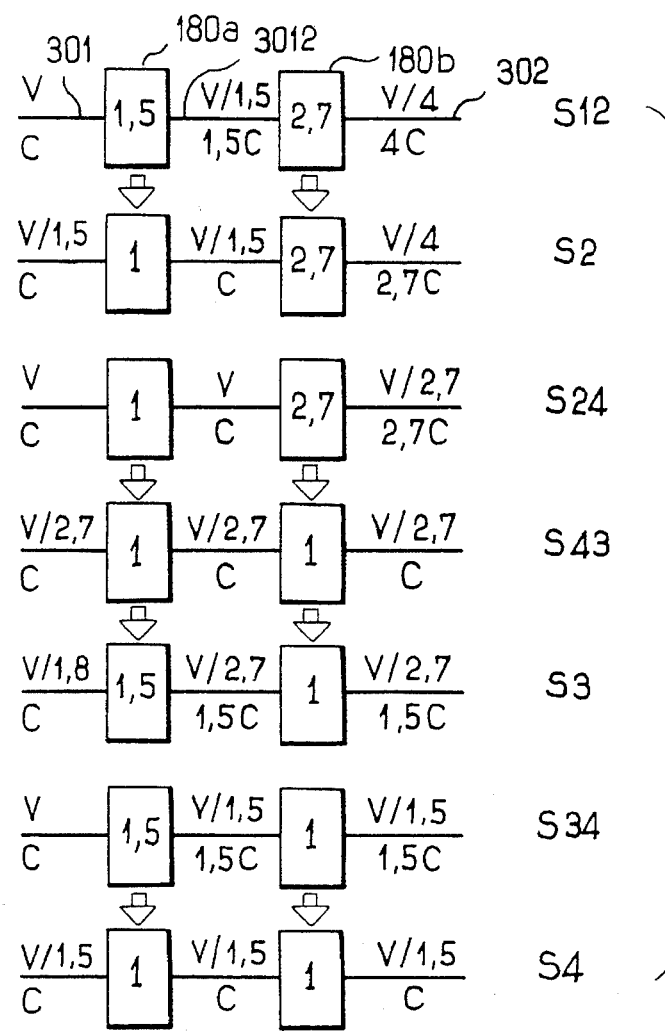
FIG_18
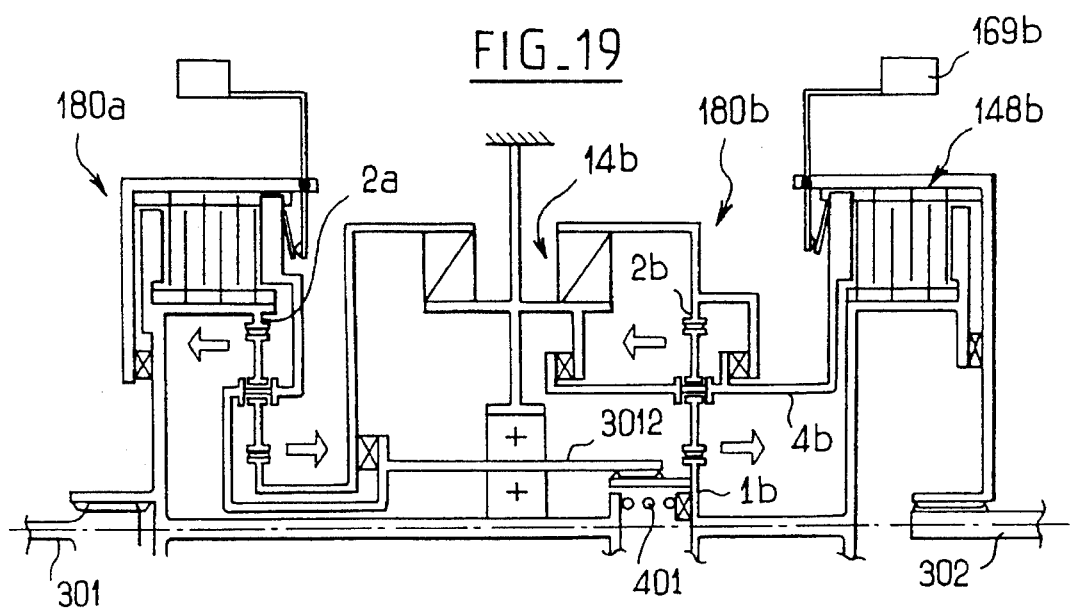
FIG_19

5,514,044

IN-SERIES AUTOMATIC TRANSMISSION MODULES DIRECTLY RESPONSIVE TO TORQUE

This application is a continuation-in-part of my copending application Ser. No. 780,671 filed Oct. 18, 1991, now U.S. Pat. No. 5,263,906.

BACKGROUND OF THE INVENTION

1. Field of the Invention

The present invention concerns automatic transmission devices for automotive vehicles.

2. Background Art

In conventional automatic transmissions, epicyclic gear trains are controlled by a hydraulic power circuit that actuates brake bands or multidisk clutches to effect ratio changes, the power circuit being controlled by either a hydraulic or an electronic control circuit responsive to drive torque, to rotary speed of the engine, and/or to the vehicle speed. The drive torque typically is sensed indirectly by detecting the position of the accelerator pedal.

In spite of fifty years of improvements, conventional automatic transmissions are still encumbered to some extent by their original disadvantages: great weight, high cost, mediocre efficiency, and poor performance of the vehicle compared with that obtainable with a manually operated gear box.

Moreover, in the modern motor vehicles, the power and transmission unit has to be as compact as possible. This often raises problems, especially in the case of front-wheel drive vehicles, more specifically if the engine comprises more than four cylinders and if the transmission device offers numerous ratios and/or is of the automatically shifted type, because, then, the transmission device is necessarilly more cumbersome.

SUMMARY OF THE INVENTION

An object of the present invention is to provide an automatic transmission, particularly for automobiles, that is simpler, lighter, less expensive, and more efficient than previously known automatic transmissions.

Another object of the invention is to provide an automatic transmission in which shifting between at least two gear ratios is accomplished by mechanical means directly responsive to both rotary speed and torque.

A further object of the invention is to provide a ratio shifting clutch mechanism for a transmission containing a helical gear train that is directly responsive to torque between two meshing gears of the train and to a rotary speed of the transmission.

Yet another object of the invention is to provide a modular transmission providing a number of transmission ratios that corresponds to the number of modules composing the transmission.

Still another object of this invention is to provide a transmission apparatus offering numerous ratios while being accommodable in a space having a shape which is a priori difficult to use.

In accordance with one aspect of the invention, the transmission apparatus comprises:

a succession of at least two modules each having an input element and an output element and which are connected together in series by at least one intermediate element being the output element of one of the modules and the input element of the other of said modules, wherein each module is essentially self-controlled and comprises means for selectively defining two different transmission ratios, torque-responsive means tending to automatically shift down said module as a torque present in said module increases, and speed-responsive means increasingly tending to automatically shift up said module as a speed present in said module increases.

At the beginning of operation, all the modules operate at their low ratio, and the speed in each of them therefore decreases from the module adjacent to the input of the transmission apparatus to the module adjacent to the output. The torque, on the other hand, increases from the input module to the output module. It is therefore the input module (low torque, high speed) that first shifts to its higher ratio. This reduces the torque in the following module, but does not modify its speed, which is determined by the speed of the vehicle, since the transmission ratios in the following modules have not been modified. Accordingly, supposing that the engine torque remains constant, the engine speed and consequently the vehicle speed must increase before the second module shifts in turn to its higher ratio, and so on.

Thus a simple design is obtained, as well as the possibility of increasing the number of ratios of the transmission by increasing the number of modules. If desired, the latter can be all strictly identical, even as regards the functional settings.

It thus appears that modules which are separately controlled by internal means get spontaneously organized between them in a way just as needed for motor-cars.

Thus, centralized control of the transmission apparatus is dispensed with.

In the modules, further simplification is obtained if the speed responsive means rely upon centrifugal thrust and the torque responsive means rely upon the use of the axial thrust developed by helical gear teeth under meshing. Such thrusts are measures of the speed and torque and at the same time are large enough to be actuating forces for a clutch or a brake.

According to a second aspect, the transmission apparatus comprises:

an input element, an intermediate element and an output element;

an input transmission device mounted between the input element and the intermediate element selectively shiftable between a lower transmission ratio and a higher transmission ratio; and an output transmission device mounted between the intermediate element and the output element, and comprising torque-responsive means increasingly tending to automatically shift down said output transmission device as torque to be transmitted by said output transmission device increases, and speed-responsive means increasingly tending to automatically shift up said output transmission device as a speed in said output transmission device increases.

When the input transmission device is shifted down, the torque transmitted to the output transmission device is higher and thus a higher speed of the intermediate element will be necessary for automatic shifting up of the output transmission. This means a still higher speed of the input element because the input transmission device, when shifted down, raises the speed of the input element with respect to that of the intermediate element. Thus, the output device is not only automatic, but is also inherently able to have different behaviours according to whether the input transmission device is shifted up or down.

According to an improvement, the input transmission device is itself automatic and is responsive to torque for shifting down when the torque transmitted is higher.

The output transmission device can be a module or even a succession of modules according to the first aspect of the invention.

According to a third aspect of the invention, a transmission apparatus comprises at least two transmission modules arranged along distinct axes, control means for controlling operation of each of both said modules selectively in one and the other of at least two transmission ratios, and a mechanical connecting means connecting an input of one of said modules with an output of another of said modules whereby the modules are mounted mechanically in series, and wherein the control means are distributed in the modules and allow susbtantially autonomous shifting of at least some of the modules between said one and said other transmission ratio on the basis of parameters which are available in the respective modules.

Modules which are able to operate autonomously and which get spontaneously organized between them, e.g. as a result of the first or second aspect of the invention afford a freedom of disposing them according to various designs, e.g. side by side in a rectilinear or arcuate array etc..

The invention thus allows to serially mount relatively small-sized modules in an arrangement that is freely selected in view of an optimized use of the available space in the motor compartment of the vehicle.

The invention also allows designs in which the output of the transmission device is in a favourable position for transmission towards each of the driving wheels of the vehicle.

Independently of the arrangement of the modules, there is no need to design a complicated control device which would have to be adaptable onto the modules. This further reduces the design expenses which are specific for each type of vehicle which are to be equipped with the modular transmission device according to the invention.

This "substantially autonomous" control of some at least of the modules does not exclude that the modules receive from the outside simple information such as information which can be transmitted electrically, for example a "kick-down" control to force operation of the module in its mode of strongest speed-reduction when the driver of the vehicle completely depresses the accelerator pedal.

According to an other aspect of the invention, there is also provided a power and transmission unit for a motor vehicle or the like, comprising an engine and a transmission device according to the first, second or third aspect.

BRIEF DESCRIPTION OF THE DRAWINGS

In the appended drawings, given as non-limiting examples:

FIG. 1 is a cut-away perspective view of an epicyclic train of a known kind, with representations of certain forces involved in its operation;

FIGS. 2 and 3 are partial plan views of the teeth of the sun gear and of the ring gear, respectively, of the epicyclic train of FIG. 1;

FIG. 4 is an example of a torque curve of an internal combustion engine in relation to the speed of rotation for different percentages of opening of the throttle valve;

FIG. 5 is a half-view in axial section of a two-ratio module adapted for use in a transmission apparatus according the invention;

FIGS. 6 and 7 are two half-views of the same module when it is operating at its higher ratio and at its lower ratio, respectively;

FIG. 8 is a half-view in axial section of a transmission apparatus according to a first embodiment of the invention;

FIGS. 9 to 12 are partial views in section of the centrifugal clutch of the transmission apparatus of FIG. 8, at four stages off operation;

FIG. 13 is a schematic part view of a second embodiment of the invention;

FIG. 14 is an axial sectional view of a transmission apparatus according to a third embodiment of the invention, wherein both end modules are shown in half view only;

FIG. 18 is a diagrammatic view of a further embodiment, in seven different situations; and FIG. 19 is a schematic view of an arrangement corresponding to the embodiment of FIG. 18.

DESCRIPTION OF THE PREFERRED EMBODIMENTS

Figure 15:
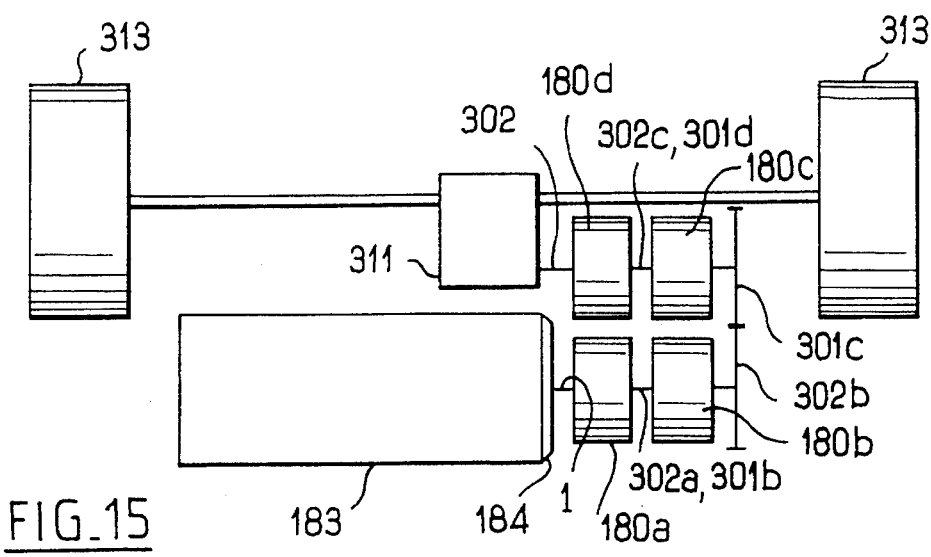
FIG. 15 and 16 are diagrams of two examples of a power and transmission unit according to the invention for a front-wheel drive vehicle.

As shown in FIG. 1, an epicyclic train normally has a sun gear 1 with external helical teeth, a ring gear 2 having internal helical teeth and a diameter greater than the outer teeth of the sun gear 1, and between the sun Wear 1 and the ring gear 2, planet gears 3 which mesh with the sun gear 1 and the ring gear 2.

The planet gears are supported in rotation by a planet holder 4 which is represented only in fine lines. If it is assumed that the shaft 6 on which the sun gear 1 is fixed is, for example, the input shaft, the ring gear 2 can be locked, enabling the planet holder 4 to perform a rotational movement coaxial with the shaft 6, but slower than that of shaft 6. The epicyclic train then operates as a speed reducer with a relatively high reduction ratio. If, however, the sun gear 1 is locked, and the ring gear 2 is connected to the input and the planet holder 4 to the output, the gear train will again work as a speed reducer, but with a lower ratio than in the preceding case. If, however, the ring gear 2 and the planet holder 4 are connected to one another, or the planet holder 4 to the shaft 6, or ring gear 2 to shaft 6, the entire epicyclic train will rotate as a single unit and constitute a direct-drive device. Also, the planet holder 4 can be locked, axed in that case the shaft 6 and ring gear 2 will revolve inversely, so a reverse drive will thus be obtained, which will be a speed-reducing drive if the input is applied to shaft 6, and a speed-multiplying drive if the input is applied to ring gear 2.

For the speed-reducing or reverse modes operation, the forces applied to the teeth of the sun gear 1 and of the ring 2 have been represented by the arrows $F_p$ and $F_c$ when for example the ring 2 is held and the sun gear 1 transmits a torque in the sense of the arrow G.

These forces $F_p$ and $F_c$ are exerted on the flanks of the teeth of the sun gear 1 and on those of the ring gear 2, respectively. Since these flanks are oblique with respect to the axis of the transmission due to the helical configuration of the teeth, the forces $F_p$ and $F_c$ are in fact directed obliquely (FIGS. 2 and 3) with respect to the axis of the transmission, that is, perpendicularly to the contact surface between teeth (disregarding the effect of friction). These contact forces $F_p$ and $F_c$ therefore have a circumferential component $F_{cp}$ and $F_{cc}$ used for the transmission of the torque, and an axial component $F_{ap}$ and $F_{ac}$ which will be utilized according to the invention.

As shown in FIG. 1, the teeth of the sun gear 1 are inclined in a direction contrary to the teeth of the ring gear 2 with respect to the axis of the transmission, so that the direction of the axial force $F_{ap}$ to which the sun gear 1 is subjected is contrary to that of the axial force $F_{ac}$ to which the ring gear 2 is subjected, as shown in FIG. 3. Consequently, in the example represented in FIG. 1, considering the sense G of the torque transmitted by the sun gear 1, the sun gear is urged axially toward the observer of FIG. 1, whereas the ring 2 is urged axially in the opposite direction. The planet gears 3, which undergo two opposite axial reactions at their points of mesh, are in equilibrium overall.

During direct-drive operation through a clutch coupling the input to the output of the planetary train, the connections through gears no longer transmit torque, and consequently the axial forces disappear. If, however, direct drive is obtained by coupling the ring gear and the planet holder while the input is made to the sun gear, axial forces continue to subsist.

Now we shall comment, referring to FIG. 4, on the drive torque curves $C_m$ expressed in an example in m.N in relation to the speed of rotation of an engine expressed in rpm. It can be seen that when the engine is running at maximum load, the drive torque reaches a maximum value at an intermediate speed on the order of 3,000 rpm, after which the torque decreases up to 6,000 rpm.

Thus, the drive torque constitutes not only a measure of the output that is demanded from the engine by the driver, but also, at least after a certain speed of around 1,500 rpm, a measure of the rotary speed of the engine. In other words, if the drive torque is greater in the example than 160 m.N, the value referenced by a horizontal line, one knows that the driving speed cannot be greater than 4,500 rpm.

A description will now be given of various embodiments of the invention which make use of the above findings, in reference to FIGS. 5–14 wherein the axial play and axial movement are exaggerated to facilitate comprehension, the play and movement being actually difficult to perceive with the naked eye.

The device represented in FIG. 5 is a two-ratio transmission with automatic shift depending on the torque present on an input shaft 7, which is fixed to the ring gear 2 of a planetary train 5 as well as to the first element 8 of a multidisk oil-bath clutch. The planet holder 4 of the planetary train is affixed on the one hand to the other element 11 of the clutch 9, and on the other hand to the output shaft 12 of the transmission. The sun gear 1 of the planetary train is mounted so as to revolve freely around the output shaft 12 in the sense called "direct", that is, the normal sense of rotation of shafts 7 and 12. On the other hand, the rotation of sun gear 1 in the reverse sense is prevented by a free wheel 14 (such as an overrunning or sprag clutch) interposed between the sun gear 1 and a gear box 16 of the transmission which is only partially represented.

The sun gear 1, the ring gear 2 and the planet holder 4 are mounted so as to slide freely axially, each with respect to the other two. An axial thrust bearing 17 is placed between the sun gear 1 and the planet holder 4 to enable the sun gear 1 to thrust axially against the planet holder 4 in the direction for disengagement of the clutch 9. The helical teeth of the planetary train are orientated such that the axial reaction $F_{ap}$ which the sun gear 1 undergoes when it is relatively rotating with respect to the planet gears 3 will be directed so as to thrust the sun gear 1 axially against the planet holder 4 through the medium of the thrust bearing 17.

This axial thrust on the planet holder 4 is countered by a biased opposing means consisting of a compression spring 18 interposed between a wall 19 integral with the ring gear 2 and a pusher 21 mounted to slide axially with respect to the wall 19 and capable of thrusting against the planet holder 4 through the medium of an axial thrust bearing 22, so that the force of spring 18 is exerted on the planet holder 4 in a direction contrary to the axial reaction $F_{ap}$.

As shown in FIG. 6, when at rest, the force of spring 18 is not counterbalanced by any reaction of the sun gear 1, and consequently the pusher 21 pushes the planet holder 4 to its extreme leftward position with respect to the ring gear 2 and this causes the engagement of the clutch 9. Consequently, the thrust bearing 22 is under compression, but not thrust bearing 17. Upon start-up, if the torque to be transmitted does not exceed a certain threshold corresponding to the capacity of clutch 9 under the engaging force of spring 18, the clutch 9, which rigidly ties together the ring gear 2 and the planet holder 4, makes the planetary train operate in direct drive, i.e., the output shaft 12 rotates at the same speed as the input shaft 7. The torque transmitted produces no axial thrust on the sun gear 1, for it is transmitted not through gears but through the clutch 9 which, so to speak, shunts the gear connections.

If the torque present on shaft 7 exceeds the transmission capacity of the clutch 9, the latter starts to slip, and a certain relative rotation is produced between the gears of the epicyclic train until, at a certain stage, slippage in the clutch 9 is such that sun gear 1 tends to rotate in the reverse direction, but this is prevented by the free-wheel 14. This causes the appearance of an axial thrust $F_{ac}$ in the ring gear 2 (FIG. 7) and of a contrary axial thrust $F_{ap}$ in the sun gear 1, said contrary axial thrust being transmitted to the planet holder 4. Both axial thrusts tend to disengage the clutch 9 against the action of spring 18, so that slippage in the clutch increases and torque transmitted by meshing increases, and so on, until the clutch 9 is completely disengaged when the sun gear 1 is immobilized by the free wheel 14, the planet holder 4, and with it the output shaft 12, revolves in the direct sense, at a rotary speed lower than that of the input shaft 7. If the free wheel were not provided, the load to be driven would immobilize the shaft 12, and the sun gear 1 would revolve uselessly in reverse.

In the torque present at the input shaft 7 decreases again to the point that the axial thrust $F_{ap}$ becomes lower than the force of the spring 18, the latter produces a return to the situation of FIG. 6. The torque threshold at which this takes place preferably is a low threshold that is less than a high threshold at which the clutch 9 begins to slip. The high threshold is defined by the transmission capacity of the clutch under the force of the springs 18. This can be adjusted by properly selecting the number of the discs in the clutch. The low threshold is defined by the inclination of the gear teeth with respect to the axis, and still with respect to the force of the springs 18. Each threshold can thus be selected independently from the other during design of the transmission. When the spring 18 calls for a return to direct drive, the clutch 9 engages fully without excessive slip, because the torque to be transmitted is lower than the low threshold, and thus is much lower than the high threshold corresponding to the transmission capacity of the clutch. Moreover, as the clutch progressively engages, the axial thrust $F_{ap}$ opposing engagement of the clutch progressively disappears.

In practice, in reference to FIG. 7, if it is assumed that the spring 18 is biased so that the clutch 9 will slip above 160 m.N, it can be seen that, for an engine speed greater than 1,400 rpm and less than 4,500 rpm, if the driver abruptly makes the engine deliver its full power, for example to pass a vehicle or climb a hill, the torque furnished by the engine is going to exceed the high threshold of 160 m.N, and the transmission will adopt its operation as a speed reducer, increasing the torque delivered to the wheels of the vehicle in relation to the torque put out by the engine. The engine speed will increase and perhaps enter the zone in which the drive torque is lower than the high threshold without, however, becoming less than the low threshold. As soon as the driver lets up on the accelerator pedal, the torque on shaft 7 greatly diminishes and the spring 18 makes the transmission go back to direct drive.

Since it is known at what maximum speed (4500 rpm in the example) the torque can no longer reach or pass the threshold of 160 m.N, it is certain that the automatic change-over to speed reducing operation depending upon the torque at the input shaft 7 cannot result in overspeeding of the engine, provided only that the reduction ratio introduced by the transmission is lower than the ratio between the maximum speed of the engine and the highest speed at which the high threshold is available. For example, if the high threshold is available up to 4,500 rpm and the maximum engine speed is 6,000 rpm, it is necessary that the reduction ratio in the mechanism be no more than about 1.3, since 6,000/4,500=1.33.

During operation with engine producing a negative torque (accelerator pedal released), the transmission operates in direct drive, since the reverse torque that is transmitted reverses the direction of the thrust $F_{ap}$ on the sun gear 1 and $F_{ac}$ on the ring gear 2, whereby said thrusts can no longer oppose the spring 18 holding the clutch 9 engaged.

In the embodiment of FIG. 8, the input shaft 7 rotates together with the receiving plate 23 of a centrifugal clutch 24 which includes a drive plate 26 connected for example to the output shaft of a thermal engine (not shown). As also seen in FIGS. 9 to 12, a cylindrical bracket 27 is secured to the drive plate 26. Each of a plurality of spring leaves 28 is anchored at one of its extremities to the cylindrical bracket at points distributed on the circumference of the clutch. The other extremity of each spring leaf 28 is affixed to a skid 29 having a shoe 31 and a friction lining 32.

The receiving plate 23 itself bears a cylindrical bracket 33 of a diameter decidedly smaller than the bracket 27 of the drive plate 26. Likewise, each of a plurality of spring leaves 34 affixed at one of its extremities to the bracket 33 carries at its other end a skid 36 having a shoe 37 and a friction lining 38 situated opposite a ring 39 which surrounds them and which is affixed against the radially inner wall of the bracket 27.

As can be seen in FIG. 9, when neither of the two plates 23 and 26 is at a speed exceeding a certain low threshold, equal for example to 1,200 rpm, the spring leaves 28 and 34 hold the skids 29 and 36 away from an inner cylindrical surface 41 of the receiving plate and from the inner cylindrical surface of the ring 39, respectively.

If, beginning from this situation, the speed of the drive plate increases, the leaves 28 and skids 29 develop in themselves a centrifugal force which exceeds the flexural return force provided by the leaves 28, so that the skids 29 rub against the wall 41 in the sense producing a buttressing force on the leaves 28.

This gradually sets plate 23 in rotation in the same sense as the drive plate 26. The bracket 33 is therefore made to rotate in turn, the same as the leaves 34 and skids 36 which, when a certain speed is reached by the receiving plate 23, come to rub against the ring 39, thereby increasing the frictional engagement between the two plates.

The purpose of the bracket 33 connected to the receiving plate 23 and of the skids 36 in combination with the ring 39 is to avoid the well-known disadvantage of centrifugal clutches, which is that they do not permit re-engagement if the engine is stopped when the clutch was in the disengaged state. This is dangerous when the vehicle is running down a hill. As shown in FIG. 12, with the clutch in accordance with the invention, the bracket 33 and the skids 36 are in such a case driven in rotation, and the skids 36 come into frictional engagement with the ring 39, which therefore will set the engine plate 26 in movement and consequently restart the engine of the vehicle. Once this result is achieved or about to be achieved, the skids 29 will in turn make contact with the wall 41, and the situation of FIG. 11 will again be reached.

In the embodiment shown in FIG. 8, the transmission device is constituted by a centrifugal clutch 24 like the one in FIG. 9, followed by an axial lineup of a module 140 and, for example, two modules 180a and 180b. The input shaft 7 in the module 140, which is closest to the clutch 24, constitutes the input shaft for the entire transmission device. A transfer shaft 12a constitutes the output shaft of module 140 and also the input shaft for the following module 180a, whereas a transfer shaft 12b constitutes the output shaft of the intermediate module 180a and the input shaft for the output module 180b whose output shaft 62 is the output shaft of the entire transmission. However, if desired, reverse gear means, not shown, can be provided between shaft 62 and the output of the entire transmission.

Each successive module comprises a planetary train 139 of which, as in FIG. 5, the sun gear 141 rotates freely on the respective output shaft 12a, 12b arid 62, and is prevented from rotating backward with respect to housing 156 by a free wheel 154. Also in each successive module, the ring gear 142 is connected to the respective input shaft 7, 12a and 12b, as well as to The first element 148 of a multiple disk clutch 149 whose other element 151 is connected with the planet holder 144, which itself is connected with the respective output shaft 12a, 12b and 62. The sun gear 141, the ring gear 142 and the planet holder 144 are mounted so as to be able to slide axially, each with respect to the other two.

Each successive input shaft 7, 12a, 12b, is splined to a disk 168 pivotally supporting centrifugal weights 169, 169a and 169b respectively, which can move radially away from the axis of the mechanism about a pivot 171 such that lobes 172 of said weights axially push against the ring gear 142, together with respective shaft 7, 12a, 12b, in the direction for lightening the clutch 149 against the axial force $F_{ac}$ of the said ring gear 142, which therefore tends to disengage clutch 149. The axial thrust $F_{ap}$ of the sun gear 141, in the contrary direction, is taken up by the housing 156 through an axial thrust bearing 162. An axial thrust bearing 157 is inserted between the planet holder 144 and the sun gear 141 to permit a mutual axial thrust between them tending to engage clutch 149 during deceleration with engine braking.

The two modules 180a and 180b can be identical to each other, even as to their functional settings. Furthermore, it is possible to line up axially in this manner more than two modular mechanisms 180a and 180b to increase the number of ratios in the transmission.

Module 140 differs from the two modules 180a and 180b in that the weights 169 are much less numerous-for example, only 3 or 4 weights instead of 30 or 40 weights 169a or 169b. Between the weights of module 140 are compression springs 158 which axially thrust the ring gear 142 in the direction of engageing the clutch 149 with respect to the planet holder 144 thrusting against the housing 156 through the axial thrust bearing 162. Module 140 will act as an input two-speed mechanism which is essentially responsive to torque as described in reference to FIGS. 5–7, and the modules 180a and 180b together form a multiple-ratio mechanism.

Operation is as follows: first, clutch 149 of module 140 is engaged by the springs 158, and the clutches 149 of the modules 180a and 180b are disengaged, so that both of the modules 180a and 180b work as speed reducers. The first module 180a is the one in which the rotary speed is the highest and the torque transmitted is the lowest. It is therefore this module which first attains the conditions in which its weights 169a come to engage clutch 149 so that this module shifts into direct drive, placing the transmission in a second ratio. This reduces the torque transmitted to the next module 180b, but not its rotary speed, which is determined by the speed of the output 62. Therefore, this speed must increase, assuming the torque to be constant, before the weights of the next module 180b will shift it also into direct drive, so that the transmission will operate in a third ratio, which is the direct-drive ratio.

If the torque on the input shaft 7 exceeds the threshold defined conjointly by the springs 158 and the few weights 169 of module 140, the latter will start to operate as a speed reducer and the modules 180a end 180b still operate as described just above, with three exceptions:

Since the torque present on shaft 12a is increased, the shift from first to second requires a greater force on the part of the weights 169, and it will therefore be performed at a higher speed of shaft 12a, and accordingly at a still higher engine speed, since module 140 operating as a speed reducer increases the engine speed over that of shaft 12a, for the same reason, the shift from second to third will require a greater force on the part of weights 169b, and consequently it will be performed at higher speeds of the shaft 12b and of the engine, once this shift from second to third is performed, the engine speed will increase until the driving torque decreases sufficiently for the springs 158 and weights 169 of module 140 to cause the shift of the input module 140 to direct drive, which then constitutes a fourth transmission ratio.

An automatic transmission for vehicle has thus been achieved, which operates either with three ratios and relatively low engine speeds in normal driving, or in sport driving with four ratios, of which the first three are different from the first two of normal driving, causing the engine to run at speeds close to maximum power, which optimizes performance.

The role of the weights 169 of module 140 is to increase the torque threshold at which the module 140 will "shift down" when the engine speed of rotation increases. This threshold is indicated by the chain-dotted line 181 in FIG. 4.

In the embodiment of FIG. 13, no input such as 140 is provided and two modules such as 180a and 180b are represented. A further module such as 180b could be provided, with the output shaft 12b of represented module 180b then being the input shaft for the further module.

Module 180b of FIG. 13 differs from module 180a or 180b of FIG. 8 only as to the practical design. In other words, the operation of module 180b of FIG. 13 for shifting up and down is basically the same as that of module 180a or 180b of FIG. 8. An input module such as 140 could be provided for selectively an modifying the behaviour of modules 180a and 180b of FIG. 13.

Planet holder 4b of module 180b is retained against axial movement by a bearing 203b and is fast with a backing plate 204b of clutch 148b, and with teeth 206 driving an axially slidable weight-holder 207b pivotally supporting the centrifugal weights 169b on tangential pivot axes 208.

The clutch 148b comprises disks 209 having radially inner teeth slidably seated in splines 211 of the ring gear 2b and disks 212 alternating with disks 209 and having radially outer teeth slidably seated in splines 213 of the weight-holder 207b.

The stack of disks 209, 212 can be selectively tightened between said backing plate 204b and an axially movable tightening plate 214 which is fast with the ring gear 2b. The tightening plate 214 is axially movable because the ring gear 2b is itself axially movable thanks to splines 217 slidably connecting for common rotation the ring gear 2b with the input shaft 12a.

The weights 169b and the weight-holder 207b together form a scissor-like clamp tending to urge the tightening plate 214 and the backing plate 204b towards each other. More specifically, when the weights 169b tend to move radially away due to centrifugal force, a nose portion 218 of the weights 169b urges backing flange 204b towards the left by way of a belleville spring 219, whereas a flange 221 of the weight-holder 207b urges the tightening plate 214 by way of an axial thrust-bearing B1 towards the right of the figure. This tends to put the clutch 148b in the engaged condition while no force is transmitted to the bearing 203.

On the other hand the axial thrust $F_{ac}$, when it exists, produced by the ring gear 2b and the equal but contrary thrust $F_{ap}$ produced by the sun gear 1b directly tend to release or open the scissor-like clamp, through axial thrust bearing B1 and respectively through an axial thrust bearing B2 provided between the sun gear 1b and the planet holder 4b. Again, no thrust is transmitted to the bearing 203b.

The purpose of the belleville spring 219 is to put the module in direct drive when the transmission is at rest for safety purposes, and to mitigate the steeply rising curve of the centrifugal forces as a function of rotating speed.

In module 180b of FIG. 13, contrary to FIG. 8, the weights 169b are subjected to the speed of rotation of the output of the module, whereby the centrifugal force produced does not decrease when shifting up is in progress.

Module 180a differs from module 180b in that the sun gear 1a is connected to the input shaft 7 and the ring gear 2a is connected to the output 12a. The planet holder 4a is connected to the free-wheel 14a.

The planet holder 4a carries pairs of planets 3a is each pair, both planets 3a mesh together. Moreover, one of the planets 3a of the pair meshes with the ring gear 2a and the other meshes with the sun gear 1a. This modification allows a higher reduction ratio for module 180a when operating as a speed reducer, whereby, as is generally desired, the ratio gap between the first and the second transmission ratios of the whole transmission apparatus is greater than between the other successive transmission ratios of the apparatus. Moreover, by using pairs of planets, the direction of rotation of the output 12a is the same as that of the input during the speed-reducing operation despite the fact that the power conveying element connected to the free wheel is the planet holder (it has been explained hereinabove that in this case the planetary train operates as a speed reversing mechanism if single planets are used).

Again, as in module 180*b*, the weights 169*a* are subjected to the speed of rotation of the output of the module.

Thus, the weight-holder is driven in rotation by the ring gear 2*a* while being slidable with respect thereto thanks to splines. Backing plate 204*a* is fast with input shaft 7 which is retained against translation by a bearing 203*a*. Tightening plate 214 is again fast with ring gear 2*a*. This scissor-like arrangement provided by weights 169*a* and weight-holder 207*a* tend to tighten or engage clutch 148*a* between the nose portions 218 and the flange 221 acting on backing plate 204*a* through an axial thrust bearing B3. Since the sun gear 1*a* and ring gear 2*a* are directly connected each to one of the backing and tightening plates 204*a*, 214, the axial thrusts tending to untighten the scissor-like arrangement are directly available where they are useful whereby only one axial thrust bearing (B3) is used, instead of two (B1, B2) in module 180*b*.

In the embodiment shown in FIG. 14 an engine 183, very partially and diagrammatically shown, drives a shaft 301 by way of a clutch 184, for example of the automatic type as disclosed with reference to FIGS. 9–12. Only the outer casing of clutch 184 is shown. The shaft 301 is the input shaft in a first two-ratios module 180*a* having an output 302*a* which is provided by a toothed wheel which meshes with an input toothed wheel 301*b* in a second two-ratios module 180*b* which is identical to the first module 180*a* except for differences which will be explained hereinbelow. An output 302*b* of module 180*b* meshes with an input 301*c* of a third module 180*c* having an output 302 which constitutes the output of the transmission device formed by the modules 180*a*, 180*b*, 180*c*.

Instead of being coaxial, these modules have respective axes Da, Db and Dc which are distinct from each other. In the example, said axes are parallel to each other and spaced apart from each other, whereby the axial length of the transmission device is almost identical to the axial length of anyone only of the three modules 180*a*, 180*b* and 180*c*.

Each module comprises in a respective casing 16, a combination of gears defining different transmission ratios between the input shaft 1, 1*b* or 1*c*, and the output 2*a*, 2*b* or 2.

In the example shown in FIG. 14, the combination of gears corresponds to module 180*b* of FIG. 13, except for the following, referring to module 180*b* of FIG. 14.

The backing plate 204 is fast with the planet holder 4 and the tightening plate 214 is driven in rotation by the planet holder 4 while being axially movable with respect thereto. The axial thrust of the ring gear 2 is transmittable to the tightening plate 214 via an axial thrust bearing B4. This axial thrust is assisted by springs 229, only one of which is shown.

The contrary axial thrust of the sun gear 1 is transmitted via an axial thrust bearing B5 to the roll bearings 203 supporting the planet holder.

The basic operation of the transmission apparatus of FIG. 14 is generally the same as disclosed for modules 180*a* and 180*b* of FIG. 8 and 13, except that the output of module 180*a* and 180*b* is connected by meshing, instead of directly, to the input of the respectively following module.

This transmission apparatus could also be used with an engine the cylinders of which would be disposed horizontally substantially in the same plane as the axes Da, Db and Dc of the modules.

Since the modules comprise control means in themselves (weights 169, springs 229, axial thrust bearing B4), there is no necessity of realizing a control device which would be adaptable on the array of modules. Thus essentially, the only need consists in realizing a plurality of identical or similar modules and to secure them to each other, for example by securing to each other the casings 16.

FIG. 15 shows an other example, of a power and transmission unit according to the invention.

The engine 183 is disposed transversely, in other words parallel to the axes of the driving wheels 313, each of which is connected to one of the outputs of a differential device 311. The latter can be conventional in its principle. The input of the differential 311 is provided by the output 302 of the transmission device.

The transmission device comprises four modules 180*a*, 180*b*, 180*c* and 180*d* instead of three in the previous example. The module 180*d* is identical to the modules 180*b* and 180*c*.

Both modules 180*a* and 180*b* are mutually coaxial and coaxial with the engine 183. In other words, the output 302*a* of module 180*a* is the same as the input 301*b* of module 180*b*.

Similarily, the modules 180*c* and 180*d* are coaxial so that the output 302*c* of module 180*c* is the same as the input 301*d* of module 180*d*. The common axis of modules 180*a* and 180*b* is parallel to that of modules 180*c* and 180*d*, and spaced apart therefrom. The output 302*b* of module 180*b* is provided by a toothed wheel meshing with another toothed wheel providing the input 301*c* of module 180*c*.

Thanks to this arrangement, the engine 183, the clutch 184 and the transmission device are easily accommodated between the driving wheels 313, whereas there is further obtained the advantage that the differential device 311 can be located at equal distance between both wheels.

Figure 16:
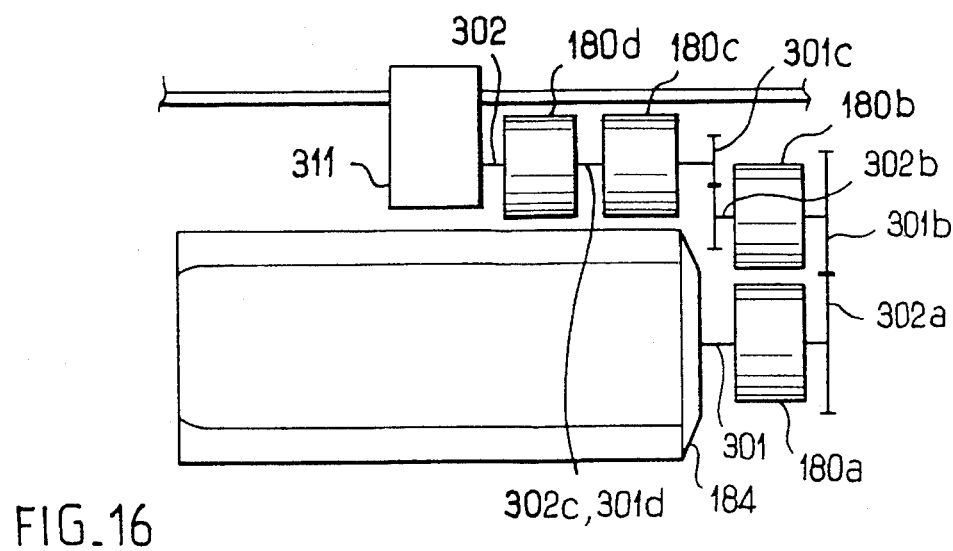

The example of FIG. 16 may be preferred if the engine is axially longer, e.g. in the case of an engine having six cylinders disposed in line.

There is again the transmission device having four modules 180*a*, 180*b*, 180*c* and 180*d*, the output of which is also the input of the differential device 311.

The arrangement of the modules 180*a* and 180*b* with respect to each other is identical to that of FIG. 14.

The output 302*b* of module 180*b* is provided by toothed wheel which meshes with the toothed wheel providing the input 301*c* of module 180*c*. The module 180*c* and the module 180*b* are arranged on either side of the plane of the toothed wheels 301*c* and 302*b*. The general arrangement of the modules 180*c*, 180*d* and the differential device 311 is identical to that of FIG. 15.

Figure 17:
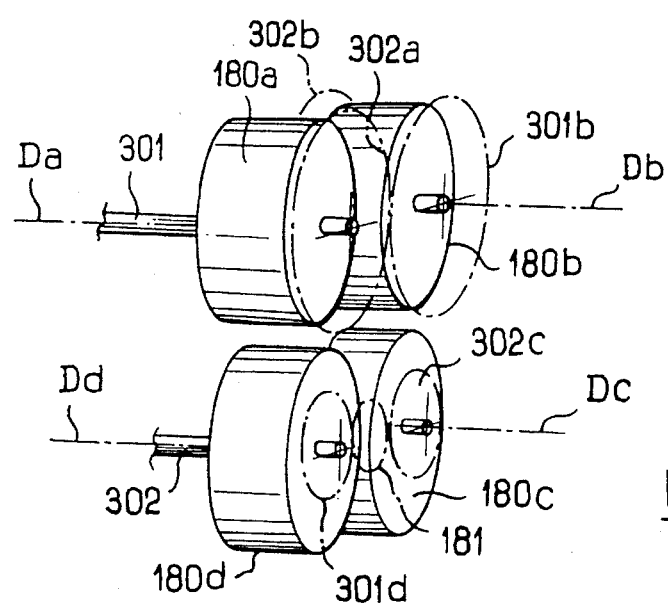
FIG. 17 is a diagrammatic perspective view of another example of a transmission apparatus according to the invention.

In the example of FIG. 17, the four modules 180*a*–180*d* are disposed in a similar fashion as that illustrated in FIG. 1 for modules 180*a*–180*c*, but the axes Da, Db, Dc and Dd, instead of being coplanar, are arranged along a circle, in other words they are four generating lines of a same virtual cylinder. The modules 180*a* and 180*b* are connected to each other as those of FIGS. 14 and 16.

The modules 180*b* and 180*c* are connected to each other as those of FIG. 14 but this is difficult to see in FIG. 17 as a consequence of the point from which the perspective view is seen. The modules 180*c* and 180*d* are connected to each other by gears comprising an intermediate gear 181, whereby the toothed wheels 301*d* and 302*c* providing the input of module 180*d* and respectively the output of module 180*c*, can have a shorter diameter, thereby not to interfere with the toothed wheels providing the output 302a of module 180a and the input 301b of module 180b.

In the exemple of FIG. 18, there is provided between an input shaft 301 and an output shaft 302 a first module 180a mounted in series with a second module 180b through an intermediate shaft 3012.

First module 180a, adjacent to input shaft 301, and second module 180b adjacent to output shaft 302, are basically of the same type as modules 180a and 180b of FIG. 13 in that they are inherently responsive to speed for shifting up into direct drive and to torque for shifting down into gear drive. In gear-drive, module 180a produces a gear ratio equal to e.g. 1:1.5. However, module 180b produces in gear drive a much shorter gear ratio, equal to 1:2.7 in the example.

Moreover, the module 180a, for a given input torque "C" at its input 301, shifts up when the speed of its output shaft 3012 is at least equal to V/1.5 (thus corresponding to an input speed v—e.g. equal to 3000 rpm—just before shifting).

By contrast, for the same input torque "C" at its input 3012, the second module 180b shifts up when the speed of its output shaft 302 is at least equal to V/2.7, i.e. at a much slower output speed than the first module 180a.

The operation of this arrangement is as follows.

It will be first assumed that the engine delivers a constant torque "C" in all the situations here in after depicted. All the situations shown in FIG. 18 are designated by letter S followed by the number of the prevailing ratio alone if the situation is stable, or further followed by the ratio tendind to replace the prevailing ratio if the situation is unstable. For example, S3 means that the situation is stable, with the 3rd ratio prevailing, whereas S34 also means that the 3rd ratio prevails, but the situation is unstable, the 4th ratio will immediately replace the 3rd ratio.

It is necessary to understand that each time a shifting operation occurs, the speed of output shaft 302 remains unchanged, whereas the input shaft and intermediate shaft have to adapt their speed to the newly prevailing ratio.

Starting of the vehicle begins with both modules operating in gear drive, for reasons which will be apparent from the foregoing examples of FIG. 8 or 13. This is the first ratio, equal to 1:(1.5×2.7)=1:4 approximately. The engine speed climbs up to V (situation S12), the input speed of first module 180a for which first module 180a will shift up to direct drive. Second module 180b remains in gear drive because its output speed, V/4, is lower than the V/2.7 required for shifting up of module 180b under torque C.

This is the situation S2, second ratio of the transmission, equal to 1:2.7. The speed of the output shaft 302 increases up to V/2.7, situation S24, in which the second module 180b shifts up into direct drive, whereby the whole transmission is in direct drive (fourth ratio). However this situation S43 is in turn unstable because the output speed of the first module 180a falls down to V/2.7, a speed for which first module 180a shifts down into gear drive whereby a third ratio (situation S3), equal to 1:1.5 is produced. This results is an increase of the input torque of the second module 180b up to 1.5 C. For avoiding that the second module 180b again shifts down due to this torque increase, second module is designed to have a strong hysteresis effect, i.e. for each output speed of the second module, there is a large difference between the upper torque threshold above which the module shifts down and the lower torque threshold below which it shifts up. Description of FIG. 5 has shown that these two thresholds can be set independently from each other. The problem of avoiding that module 180b again shifts down in situation S3 is also in part solved by the fact that at the beginning of situation S3 the engine, with its speed being as low as v/1.8 (e.g. 1700 rpm), has in most cases a reduced torque, i.e. lower than C in the example. Then, when the engine speed again increases in situation S3, the speed of output shaft 302 also increases and more and more stabilizes the operation of the second module in direct drive. It should be noted that practically situation S43 does not clearly exist because module 180a begins to shift down before module 180b has finished to shift up.

Finally, in situation S34 in which output speed of first module 180a again reaches V/1.5, first module 180a shifts up again, and situation S4 appears, in which the ratio of the whole transmission is 1:1. This situation, contrary to situation S43, is stable because the output speeds of both modules are above the respective shifting up threshold, thus certainly above the shifting down threshold.

FIG. 19 illustrates an embodiment corresponding to FIG. 18. Module 180a is very similar to module 180b of FIG. 13 and will not be described again. The output shaft 3012 of module 180a is connected for common rotation with the sun gear 1b of module 180b. The ring gear 2b of module 180b is connected to the free wheel 14b. The planet-holder 4b is connected for common rotation with the output shaft 302. This arrangement, i.e. input on the sun gear 1b, output on the planet-holder 4b allows the short gear-ratio, 1:2.7, needed for the second module according to FIG. 18.

A compression spring 401 is interposed between the axially movable sun gear 1b of second module 180b and the axially movable ring gear 2a of first module 180a for biasing both the sun gear 1b and the ring gear 2a into their position corresponding to gear drive operation of their respective module. Spring 401 is of a kind such that a small compression displacement strongly increases the biasing force produced.

Thus, the change from situation S24 to S43 of FIG. 18 has needed that the flyweights 169b of module 180b have been able to tighten the clutch 148b while bringing The spring 401 to its maximum compression state. The corresponding biasing force assists the first module 180a in shifting down, whereby situation S3 is reached.

This substantially reduces the biasing force of spring 401, and thus assists module 180b in remaining in direct drive.

A possible drawback of the arrangement of FIGS. 18–19 is that the ratio-jump between 1st ratio and 2nd ratio of the transmission, and the ratio-jump between the 3rd ratio and 4th ratio of the transmission are both equal to the ratio-jump between gear drive and direct drive of the first module 180a. It is generally desired that the ratio-jump between 1st and 2nd ratio be rather large, for example from 1:4 to 1:2.2, and the ratio jump between 3rd and 4th be rather narrow, e.g. from 1:1.3 to 1:1.

However, spring 401 compensates for this: its having a maximum weakness when both modules are in gear drive promotes early shifting up from 1st to 2nd, as is appropriate with the relatively narrow jump between these ratios, whereas the increased force on the spring when the second module 180b is shifted up tends to delay shifting up from 3rd into 4th ratio, as is desirable for bridging the gap between these two ratios.

Of course, the invention is not limited to the examples described and illustrated.

In the example of FIGS. 14–19, a torque-responsive module such as 140 of FIG. 8 could be used.

Although it is preferred that the operation of the modules be as autonomous as possible, it is nevertheless possible to provide means for supplying them with specific information or controls in predetermined conditions for example in case of abrupt acceleration or braking.

In the example of FIGS. 14–17, neither the way in which the modules are secured together, nor the way in which the transmission device is secured to a vehicle frame, nor the possible hoods that can be provided for protecting the connecting gears are shown. Such additional means are easily conceivable by one having an ordinary skill in the art.

It is possible to give to the modules an arrangement such that the axes of the modules form angles between them.

Although various module structures are shown to exemplify a wide range of possibilities, it should be noted that the module structure according to FIG. 13 is presently preferred. Adaptation to the other embodiments of the transmission apparatus, i.e. of FIGS. 8, 14 and following is within the capability of the one skilled in the art.

I claim:

1. A transmission apparatus comprising at least two transmission modules arranged along distinct axes, control means for controlling operation of each of both said modules selectively in one and the other of at least two transmission ratios, and a mechanical power coupling means providing a connection between a rotary input of one of said modules and a rotary output of another one of said modules, whereby the modules are mounted mechanically in series, all rotary torque-transmitting elements of said one module, other than said rotary input, being disconnected from said other module, and wherein the control means are distributed in the modules and allow substantially autonomous shifting of each of the modules between one and the other transmission ratio on the basis of parameters which are available in the respective modules.

2. A transmission apparatus according to claim 1, wherein both modules have parallel axes.

3. A transmission apparatus according to claim 1, comprising at least three modules mounted side by side with parallel axes and mechanically connected in series by mechanical connecting means which are inserted between the successive modules.

4. A transmission apparatus according to claim 3, wherein the modules mounted side by side form a rectilinear array.

5. A transmission apparatus according to claim 3, wherein the modules are mounted to form an arcuate array.

6. A power and transmission apparatus according to claim 1, comprising a third transmission module mounted coaxially and mechanically in series with one of said at least two transmission modules, and having control means for controlling operation of said third module selectively in a first and in a second transmission ratio.

7. A transmission apparatus according to claim 1, wherein at least one of the modules comprises:

a differential gear having three rotary elements provided with intermeshed helical teeth:

a free-wheel which prevents reverse rotation of one of the rotary elements;

a friction clutch for selectively coupling together two of said rotary elements;

a means for urging the clutch towards a coupled condition;

and wherein one of the three rotary elements is so axially movable for transmitting to the clutch a thrust originating from said helical teeth which intermesh under load when the clutch is in a released condition, said thrust tending to oppose movement of the clutch from the released condition into the coupled condition.

8. A transmission apparatus according to claim 7, wherein the means for urging the clutch comprise centrifugal weights.

9. A transmission apparatus according to claim 7, wherein the means for urging the clutch comprise a resilient means.

10. A power and transmission unit for a motor-vehicle comprising an engine and a transmission apparatus comprising at least two transmission modules arranged along distinct axes, control means for controlling operation of each of both said modules selectively in one and the other of at least two transmission ratios, and a mechanical power coupling means providing a connection between a rotary input of one of said modules and a rotary output of another one of said modules whereby the modules are mounted mechanically in series, all rotary torque-transmitting elements of said one module, other than said rotary input, being disconnected from said other module, and wherein the control means are distributed in the modules and allow substantially autonomous shifting of each of the modules between one and the other transmission ratio on the basis of parameters which are available in the respective modules.

11. A power and transmission unit according to claim 10, wherein at least one of the modules comprises:

a differential gear having three rotary elements provided with intermeshed helical teeth;

a free-wheel which prevents reverse rotation of one of the rotary elements;

a friction clutch for selectively coupling together two of said rotary elements;

a means for urging the clutch towards a coupled condition;

and wherein one of the three rotary elements is axially movable for transmitting to the clutch a thrust originating from said helical teeth which intermesh under load when the clutch is in a released condition, said thrust tending to oppose movement of the clutch from the released condition into the coupled condition.

12. A power and transmission unit according to claim 11, wherein the means for urging the clutch comprise centrifugal weights.

13. A power and transmission unit according to claim 11, wherein the means for urging the clutch comprise a resilient means.

14. A transmission apparatus comprising at least three transmission modules arranged side by side along parallel axes, control means for controlling operation of each of said three modules selectively in one and the other of at least two transmission ratios, a first mechanical power coupling means providing a connection between a rotary input of a second one of said modules and a rotary output of a first one of said modules, and a second mechanical power coupling means providing a connection between a third one of said modules and a rotary output of a second one of said modules, whereby the modules are mounted mechanically in series, and wherein the control means are distributed in the modules and allow substantially autonomous shifting of each of the modules between one and the other transmission ratio on the basis of parameters which are available in the respective modules.

15. A transmission apparatus according to claim 14, wherein the modules mounted side by side form a rectilinear array.

16. A transmission apparatus according to claim 14, wherein the modules are mounted to form an arcuate array.

17. A transmission apparatus according to claim 14, wherein at least one of the modules comprises:

a differential gear having three rotary elements provided with intermeshed helical teeth;

a free-wheel which prevents reverse rotation of one of the rotary elements;

a friction clutch for selectively coupling together two of said rotary elements;

a means for urging the clutch towards a coupled condition;

and wherein one of the three rotary elements is axially movable for transmitting to the clutch a thrust originating from said helical teeth which intermesh under load when the clutch is in a released condition, said thrust tending to oppose movement of the clutch from the released condition into the coupled condition.

18. A transmission apparatus according to claim 17, wherein the means for urging the clutch comprise centrifugal weights.

19. A transmission apparatus according to claim 17, wherein the means for urging the clutch comprise resilient means.

20. A transmission apparatus comprising at least three transmission modules, control means for controlling operation of each of said three modules selectively in one and the other of at least two transmission ratios, a first mechanical power coupling means providing a connection between a rotary input of a second one of said modules and a rotary output of a first one of said modules, and a second mechanical power coupling means providing a connection between a rotary input of a third one of said modules and a rotary output of a second one of said modules, whereby the modules are mounted mechanically in series, wherein the control means are distributed in the modules and allow substantially autonomous shifting of each of the modules between one and the other transmission ratio on the basis of parameters which are available in the respective modules, and wherein two of the three modules are arranged along distinct axes and a third one of the three modules is coaxially connected to one of the said two modules.

21. A transmission apparatus according to claim 20, wherein said two modules have parallel axes.

22. A transmission apparatus according to claim 20, wherein at least one of the modules comprises:

a differential gear having three rotary elements provided with intermeshed helical teeth;

a free-wheel which prevents reverse rotation of one of the rotary elements;

a friction clutch for selectively coupling together two of said rotary elements;

a means for urging the clutch towards a coupled condition; and wherein on of the three rotary elements is axially movable for transmitting to the clutch a thrust originating from said helical teeth which intermesh under load when the clutch is in a released condition, said thrust tending to oppose movement of the clutch from the released condition into the coupled condition.

23. A transmission apparatus according to claim 22, wherein the means for urging the clutch comprise centrifugal weights.

24. A transmission apparatus according to claim 22, wherein the means for urging the clutch comprise resilient means.

25. A transmission apparatus comprising at least two transmission modules arranged along distinct axes, control means for controlling operation of each of both said modules selectively in one and the other of at least two transmission ratios, and a mechanical power coupling means providing a connection between a rotary input of one of said modules and a rotary output of another one of said modules, whereby the modules are mounted mechanically in series, wherein the control means are distributed in the modules and allow substantially autonomous shifting of each of the modules between one and the other transmission ratio on the basis of parameters which are available in the respective modules, and wherein at least one of the modules comprises:

a differential gear having three rotary elements provided with intermeshed helical teeth;

a free-wheel which prevents reverse rotation of one of the rotary elements;

a friction clutch for selectively coupling together two of said rotary elements;

a means for urging the clutch towards a coupled condition;

and wherein one of the three rotary elements is axially movable for transmitting to the clutch a thrust originating from said helical teeth which intermesh under load when the clutch is in a released condition, said thrust tending to oppose movement of the clutch from the released condition into the coupled condition.

26. A transmission apparatus according to claim 25, wherein the means for urging the clutch comprise centrifugal weights.

27. A transmission apparatus according to claim 25, wherein the means for urging the clutch comprise resilient means.

28. A power and transmission unit for a motor-vehicle, comprising an engine and a transmission apparatus comprising at least two transmission modules arranged along distinct axes, control means for controlling operation of each of both said modules selectively in one and the other of at least two transmission ratios, and a mechanical power coupling means providing a connection between a rotary input of one of said modules and a rotary output of another one of said modules whereby the modules are mounted mechanically in series, wherein the control means are distributed in the modules and allow substantially autonomous shifting of each of the modules between one and the other transmission ratio on the basis of parameters which are available in the respective modules, and wherein at least one of the modules comprises:

a differential gear having three rotary elements provided with intermeshed helical teeth;

a free-wheel which prevents reverse rotation of one of the rotary elements;

a friction clutch for selectively coupling together two of said rotary elements;

a means for urging the clutch towards a coupled condition;

and wherein one of the three rotary elements is axially movable for transmitting to the clutch a thrust originating from said helical teeth which intermesh under load when the clutch is in a released condition, said thrust tending to oppose movement of the clutch from the released condition into the coupled condition.

29. A power and transmission unit according to claim 28, wherein the means for urging the clutch comprise centrifugal weights.

30. A power and transmission unit according to claim 28, wherein the means for urging the clutch comprise resilient means.

* * * * *